(12) United States Patent
Wallis et al.

(10) Patent No.: US 11,684,997 B2
(45) Date of Patent: Jun. 27, 2023

(54) MANUFACTURE OF A HOLLOW AEROFOIL (71) Applicant: ROLLS-ROYCE plc, London (GB)

(72) Inventors: Michael J. Wallis, Clitheroe (GB);
Andrew R. Fearn, Nottingham (GB);
Paul Mason, Derby (GB)

(73) Assignee: Rolls-Royce plc

( * ) Notice: Subject to any disclaimer, the term of this patent is extended or adjusted under 35 U.S.C. 154(b) by 236 days.

(21) Appl. No.: 16/419,281

(22) Filed: May 22, 2019

(65) Prior Publication Data

US 2019/0366470 A1 Dec. 5, 2019

(30) Foreign Application Priority Data

Jun. 4, 2018 (GB) ...................... 1809111

(51) Int. Cl.
| *B23K 20/00* | (2006.01) |
| *B23K 20/02* | (2006.01) |
| *B23K 1/00* | (2006.01) |
| *B23K 20/16* | (2006.01) |
| *B23K 20/18* | (2006.01) |
| *F01D 5/14* | (2006.01) |
| *B23K 101/00* | (2006.01) |
| *B23K 101/04* | (2006.01) |
| *B23K 103/14* | (2006.01) |

(52) U.S. Cl.
CPC .......... *B23K 20/026* (2013.01); *B23K 1/0018* (2013.01); *B23K 20/16* (2013.01); *B23K 20/18* (2013.01); *F01D 5/147* (2013.01); *B23K 2101/001* (2018.08); *B23K 2101/045* (2018.08); *B23K 2103/14* (2018.08); *F05D 2230/236* (2013.01); *F05D 2230/237* (2013.01); *F05D 2300/133* (2013.01)

(58) Field of Classification Search
CPC ....... B23P 15/04; B21D 26/055; B21D 53/78; B21D 26/021; B21D 22/02; B23K 20/02; B23K 20/023; B23K 2103/14; B23K 15/0053; B23K 15/0093; B23K 1/0018
See application file for complete search history.

(56) References Cited

U.S. PATENT DOCUMENTS

| 4,526,312 A | 7/1985 | Goss et al. |
| 5,297,937 A | 3/1994 | Umetani et al. |
| 5,469,618 A | 11/1995 | Lemonds et al. |

(Continued)

FOREIGN PATENT DOCUMENTS

| EP | 0468221 A2 | 1/1992 |
| EP | 0549172 A1 | 6/1993 |
| GB | 2306353 | 5/1997 |

OTHER PUBLICATIONS

Extended EP Search Report completed Sep. 6, 2019 and issued in connection with EP Appln. No. 19172893.0.

(Continued)

*Primary Examiner* — Erin B Saad
(74) *Attorney, Agent, or Firm* — Barnes & Thornburg LLP (57) ABSTRACT

A method of manufacturing a hollow aerofoil component 100 for a gas turbine engine 10 comprises joining a first panel 200 to a second panel 300 using bonding, and hot forming the panels into shape. The bonding step and the hot forming step are performed in the same rig, thereby optimizing process time and component quality.

18 Claims, 6 Drawing Sheets

(56) References Cited

U.S. PATENT DOCUMENTS

| | | |
|---|---|---|
| 2002/0090302 A1 | 7/2002 | Norris et al. |
| 2002/0174540 A1 | 11/2002 | Milburn |
| 2004/0018091 A1 | 1/2004 | Rongong et al. |
| 2005/0011936 A1* | 1/2005 | Raybould ............ B23K 35/325 228/245 |
| 2005/0035183 A1* | 2/2005 | Beckford ............ B21D 26/055 228/193 |

OTHER PUBLICATIONS

Lyushinskii, A.V., "Diffusion Bonding Through Interlayers Based on Mixtures of Ultradisperse Metal Powders. Opart 1 Production of Interlayers based on Ultradisperse Powders of Nickel, Copper and Cobalt," Welding International, Taylor & Francis, Abingdon, GB, vol. 7, No. 12, Jan. 1, 1993, pp. 974-979.
Great Britain search report dated Nov. 27, 2018, issued in GB Patent Application No. 1809111.6.

* cited by examiner

MANUFACTURE OF A HOLLOW AEROFOIL

CROSS-REFERENCE TO RELATED APPLICATIONS

This application is based upon and claims the benefit of priority from United Kingdom patent application number GB 1809111.6 filed on Jun. 4 2018, the entire contents of which are incorporated herein by reference.

BACKGROUND

Technical Field

The present disclosure relates to a hollow aerofoil.

Description of the Related Art

Aerofoil shaped components are used throughout gas turbine engines. For example, aerofoil shaped stator vanes and rotor blades are used to guide gas through the engine, for example both in the turbine and the compressor, including the fan and associated guide vanes.

Weight reduction is an important consideration in gas turbine engines, particularly, although not exclusively, for gas turbine engines used to power aircraft. Generally, the lower the weight of the component the better the performance of the aircraft to which it is fitted, for example in terms of fuel consumption. To this end, it is known to use hollow aerofoils, e.g. rotor blades and/or stator vanes, in some stages of gas turbine engines.

One method of producing hollow aerofoil components involves welding a plate to an aerofoil structure out of which a pocket has been machined. The plate is placed into the pocket and welded in position to produce a hollow aerofoil component. However, the dimensional tolerances resulting from such a process may not be very accurate. This may be because distortion and/or internal stress is introduced during the welding process used to attach the plate to the pocketed aerofoil due to the significant local heat input in the region of the weld. Furthermore, the material properties in the region of the weld may be adversely affected by the very high local heat input required during the weld.

A further disadvantage of conventional methods for attaching a cover plate to a pocketed aerofoil is that a separate weld is required to attach each cover plate to its respective pocketed aerofoil. This makes the process of producing multiple aerofoils time consuming and expensive, because it is necessary to repeat the entire welding process for each individual vane.

United Kingdom patent application GB 2306353 A1 discloses a manufacturing process for the production of a preform of a hollow aerofoil shaped blade. The process involves cutting titanium plate material into rectangular prism shaped pieces of suitable length and thickness and joining them using diffusion bonding.

United States patent application US 2004/0018091 A1 discloses a turbomachine blade having a hollow interior and a method of manufacturing such a turbomachine blade that involves diffusion bonding at least two metal workpieces.

United States patent application US 2002/0174540 A1 discloses a method of manufacturing a sheet metal article from at least one sheet metal workpiece. The sheet metal article can be inter alia a compressor blade or a turbine blade.

It would be desirable to provide an improved process for manufacturing hollow aerofoils or at least provide a useful alternative to known processes.

SUMMARY

According to an aspect, there is provided a method of forming a hollow aerofoil for a gas turbine engine, the aerofoil having a pressure surface and a suction surface, the method comprising the steps of:
 providing a first panel;
 laying a second panel over at least a part of the first panel;
 providing a bonding material between a joining region of the first panel and a joining region of the second panel to form an aerofoil sub-assembly;
 loading the aerofoil sub-assembly into a forming rig and performing a bonding step in which the temperature of the first panel, second panel, and bonding material is raised to a bonding temperature at which the first panel and the second panel are joined together; and
 performing a hot forming step to generate the shape of the pressure surface and suction surface;
 wherein the hot forming step and bonding step are performed in the same forming rig.

An advantage of the methods described and/or claimed herein is that the number of steps required to form a hollow aerofoil may be reduced, with a corresponding reduction in component manufacture time and/or cost. This may be achieved without compromising on the quality of the finished product.

Use of a bonding material (such as an activated diffusion bonding material or a braze material, as described in greater detail elsewhere herein) that operates at similar conditions (for example in terms of temperature and/or pressure) to the hot forming step means that the two panels can be joined (in the bonding step) and formed (in the hot forming step) without any intermediate steps, in the same rig and/or within a small temperature range.

The joining regions may take any desired shape. The joining region of the first panel may be the same size and shape as the joining region of the second panel. The shape and size of the joining regions may be determined by (and/or may be the same as) the shape and size of the bonding material. The joining regions may be at, or near to, the perimeter of the panels. The joining regions may be at the parts of the panels that form the leading edge, trailing edge and tip of the formed aerofoil (for example after a finishing step).

The bonding step may be an activated diffusion bonding step. In such an activated diffusion bonding step, the bonding material would be an activated diffusion bonding material that acts to locally reduce the melting point of the first and second panels at the respective joining regions, and, at the bonding temperature, the first and second panels are joined together through activated diffusion bonding between the respective joining regions.

It will be appreciated that where the term "bonding step" is used herein, this may mean—and thus may be substituted with—"activated diffusion bonding step". Similarly, where the term "bonding material" is used herein, this may mean—and thus may be substituted with—"activated diffusion bonding material".

Thus, according to an aspect, there is provided a method of forming an aerofoil for a gas turbine engine, the aerofoil having a pressure surface and a suction surface.

The method comprises:
 providing a first panel;

laying a second panel over at least a part of the first panel; providing an activated diffusion bonding material between a joining region of the first panel and a joining region of the second panel to form an aerofoil sub-assembly, the activated diffusion bonding material acting to locally reduce the melting point of the first and second panels at the respective joining regions;

loading the aerofoil sub-assembly into a forming rig and performing an activated diffusion bonding step in which the temperature of the first panel, second panel, and activated diffusion bonding material is raised to a bonding temperature at which the first and second panels are joined together through activated diffusion bonding between the respective joining regions; and performing a hot forming step to generate the shape of the pressure surface and suction surface, wherein:

the hot forming step and activated diffusion bonding step are performed in the same forming rig.

The presence of the activated diffusion bonding material means that the bonding temperature can be lower than the melting point of the first panel and second panel. However, after completion of the activated diffusion bonding step, the material at the resulting join between the two panels may be indistinguishable from the parent material. This may be because the activated diffusion bonding material may diffuse through the parent material of the panels during the activated diffusion bonding (which may include a prolonged period at an elevated temperature (which may be the bonding temperature)). After completion of the activated diffusion bonding, it may no longer be possible to melt or substantially weaken the join between the two panels by raising its temperature back up to the bonding temperature. Indeed, the melting point (and other properties) of the material at the join may be substantially the same as that of the parent material (that is, the two panels being joined). As the activated diffusion bonding material diffuses through the structure, the melting point of the material at the joint may raise during the activated diffusion bonding step, such that the joint material solidifies during the activated diffusion bonding step.

The activated diffusion bonding material may comprise (for example may be) CuNi.

Any suitable activated diffusion bonding material may be used. The choice of activated diffusion bonding material may be dependent on the "parent" material, that is the material of the first and second panels that are joined in the activated diffusion bonding step. Purely by way of example, the activated diffusion bonding material may comprise (for example may be) CuNi (copper and nickel). Such CuNi activated diffusion bonding material may be suitable for use with titanium parent material. Where a CuNi activated diffusion bonding material is used, the melting point of a titanium panel may be reduced from around 1600 degrees C. to around 920 to 950 degrees C.

The bonding step may be a liquid interface diffusion bonding step and/or a transient liquid interface diffusion bonding. Such steps may be considered to be examples of an activated diffusion bonding step.

The bonding step may comprise (for example may be) brazing, such that the bonding material is a braze material. In such an arrangement, the braze material may be an alloy comprising aluminium and/or silver, for example it may be an aluminium-silver alloy.

The bonding step may comprise exposing the entire intermediate aerofoil assembly to an elevated temperature for a predetermined time.

The bonding step and the hot forming step may be performed without removing the panels from the forming rig. Accordingly, the intermediate assembly may be placed into the rig, and then not removed from the rig again until after both the bonding step and the hot forming step have been completed.

The bonding step may overlap (for example in time) with the hot forming step. At least a part of the bonding step may occur at the same time as at least a part of the hot forming step. The bonding step and the hot forming step may occur simultaneously. In some arrangements, the bonding step and the hot forming step may be referred to together as a combined bonding and hot creep forming step, for example a combined activated diffusion bonding and hot creep forming step.

The rig that is used for both the bonding step and the hot forming step may be an oven, such as a hot forming rig.

The temperature throughout the bonding step and the hot forming step may remain within a relatively small range, for example within a 50 degree C. range, a 40 degree C. range, a 30 degree C. range, a 25 degree C. range, a 20 degree C. range, a 15 degree C. range, a 10 degree C. range, a 5 degree C. range, or substantially the same temperature throughout.

For example, where the bonding step comprises brazing, the braze temperature of the braze material and the temperature of the hot forming step may be within the above temperature ranges.

The temperature in the rig from starting the bonding step and finishing the hot forming step may remain between 870 degrees C. and 950 degrees C., for example 880 degrees C. and 940 degrees C., for example 890 degrees C. and 930 degrees C., for example 900 degrees C. and 920 degrees C., for example around 900 degrees C., 910 degrees C. or 920 degrees C.

The methods described and/or claimed herein may be particularly quick. For example, the total time elapsed between starting the bonding step and finishing the hot forming step may be less than 2 hours.

Various temperatures and times at which those temperatures are maintained may be within the scope of the present disclosure. Purely by way of example, the temperature in the hot forming rig may be held at a first temperature (which may be around 920-950 degrees C.) from the start of the bonding step for a first time (which may be around 30 minutes), then reduced to and held at a second temperature (which may be around 10, 20 or 30 degrees C. lower than the first temperature, for example around 900-930 degrees C.) over an immediately subsequent time (for example around 60 minutes), thereby completing the hot forming step.

The first and second panels may remain unbonded (or separate) outside the joining regions, i.e. where no bonding material is present.

The method may further comprise applying a stop-off material outside the joining regions that prevents bonding between the first and second panels. Such a stop-off material may be, for example, yttria, boron nitride, graphite, or alumina.

The method may further comprise chemical cleaning of the surfaces of the first and second panels that face each other (for example, at least in the joining regions, and optionally over the full surfaces).

The first and second panels may be the same material. The first panel and/or the second panel may comprise titanium, for example in the form of a titanium alloy. Such a material may have a melting point several hundred degrees higher than the temperature of the bonding step, for example around 1600 degrees C. As noted elsewhere herein, where the bonding step is an activated diffusion bonding step, the activated diffusion bonding material may reduce the melting point of a titanium panel from around 1600 degrees C. to around 920 to 950 degrees C.

Where activated diffusion bonding material is used, it may be provided in any suitable form and in any suitable manner. For example, activated diffusion bonding material may be provided as a foil. By way of further example, activated diffusion bonding material may be positioned using a robot.

The bonding material may retain its position between the capping panel and the pocketed aerofoil body without the need to be fixed in place. Alternatively, the bonding material may be (temporarily) fixed in position prior to the bonding step. For example, where the bonding material is provided as a foil, it may be spot welded in position prior to the bonding step.

The method may further comprise forming an interim weld (for example a spot weld) between the first panel and the second panel when forming the aerofoil sub-assembly, i.e. before loading the sub-assembly into the forming rig. Such an interim weld may, for example, be provided in a region that is subsequently removed in a finishing step (such as a machining step).

The method may include one or more finishing steps after removing the joined, formed panels from the rig. Such finishing steps may include, for example, machining and/or polishing.

One of the two panels being joined (for example the first panel) may comprise a root portion that may subsequently be used to attach the finished aerofoil to a gas turbine engine. Such a root portion may be referred to as a fixture and/or may be shaped to be connectable to the gas turbine engine in use.

During the hot forming step, a surface of one of the first panel and the second panel may be formed into the pressure surface of the aerofoil. During the hot forming step, a surface of the other of the first panel and the second panel may be formed into the suction surface of the aerofoil. The surfaces that form the suction surface and the pressure surface may face away from the joining regions and/or from each other.

Any suitable hot forming process may be used. For example, the hot forming process may comprise hot creep forming. Additionally or alternatively, the hot forming process may comprise blow forming at least one of the panels that form the pressure or suction surface. The hot forming step may comprise providing a positive (i.e. above atmospheric) pressure inside the aerofoil sub-assembly (for example between the panels). Such a positive pressure may be, for example, in the range of from $3 \times 10^6$ $N^{-2}$ to $6 \times 10^6$ $Nm^{-2}$, for example in the range of from $4 \times 10^6$ $Nm^{-2}$ to $5 \times 10^6$ $Nm^{-2}$.

Any suitable pressure may be used during the bonding step. For example, the pressure inside the aerofoil sub-assembly (for example between the panels) may be reduced (for example to a vacuum or partial vacuum). The pressure outside the aerofoil sub-assembly may remain atmospheric during the bonding step.

The methods described and/or claimed herein may be used, for example, to form a stator vane for a gas turbine engine. Such a stator vane may be an outlet guide vane that is positioned in the bypass duct of a turbofan gas turbine engine in use. Such outlet guide vanes have a particularly large fan, and so the weight benefit of forming the to be hollow may be particularly large.

As referred to herein, a hollow aerofoil may include (by way of example) aerofoils having an empty cavity or aerofoils having a cavity that is filled (including substantially filled), for example with a material that is less dense than the material of the capping panel and the pocketed aerofoil body. Accordingly, the method of manufacturing an aerofoil may comprise filling the cavity with a material that is less dense than the material of the capping panel and pocketed aerofoil body. Such a material may be, for example, a damping material and/or a viscoelastic material and/or honeycomb filling.

One of the first panel and the second panel may comprise a recess (or step) into which the other of the first panel and the second panel is placed when forming the aerofoil sub-assembly. In that case, the panel that is inserted into the recess may be referred to as a cap. In such an arrangement, the bonding material may be provided around at least a portion of the perimeter of the recess.

The first and second panels may be bigger than the final formed aerofoil. For example, the major surfaces of the first and second panels may be bigger than the respective pressure surface and suction surface that they form.

The method may further comprise a finishing step in which an edge region is removed to produce at least the leading and/or trailing edges and/or tip edge of the aerofoil.

Multiple hollow aerofoils may be manufactured according to the methods and/or using the apparatus described and/or claimed herein. Various steps of the method (such as, for example, the bonding step and the hot forming step) may be performed simultaneously for all of the aerofoils. Accordingly, the method may comprise loading multiple aerofoil sub-assemblies into the forming rig, and performing the bonding and hot forming steps on each sub-assembly simultaneously.

The manufacture of any suitable number of hollow aerofoils may be completed at the same time during such a process, for example in the range of from 2 to 200, for example 10 to 100, for example 25 to 75, for example on the order of 50.

DESCRIPTION OF THE DRAWINGS

Arrangements will now be described by way of example only, with reference to the drawings, in which.

DETAILED DESCRIPTION

Aspects and embodiments of the present disclosure will now be discussed with reference to the accompanying figures. Further aspects and embodiments will be apparent to those skilled in the art.

Figure 1:
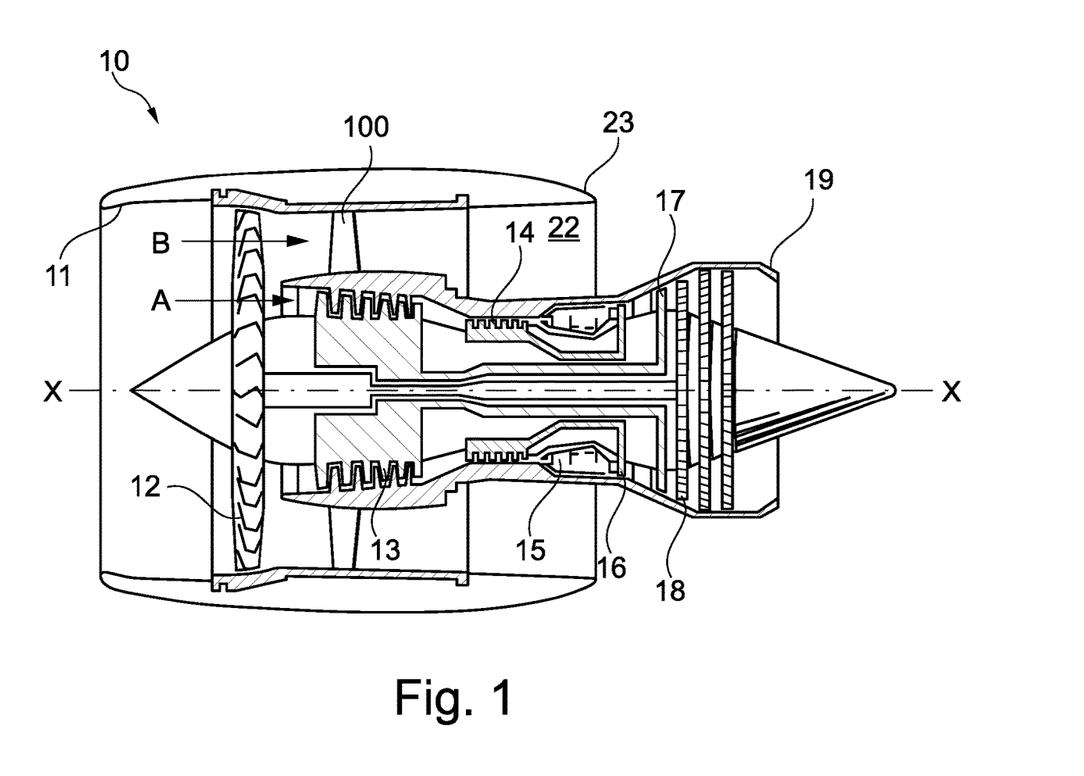
FIG. 1 is a sectional side view of a gas turbine engine having an aerofoil manufactured in accordance with the method of the present disclosure.

With reference to FIG. 1, a ducted fan gas turbine engine generally indicated at 10 has a principal and rotational axis X-X. The direction X-X may be referred to as the axial direction of the engine. The engine 10 comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 13 and a second air flow B (which may be referred to as a bypass flow B) which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines 16, 17, 18 respectively drive the high and intermediate pressure compressors 14, 13 and the fan 12 by suitable interconnecting shafts. Other gas turbine engines to which the present disclosure may be applied may have different configurations, for example having two shafts, three shafts and/or a gearbox through which the fan 12 is linked to a turbine.

The gas turbine engine 10 comprises outlet guide vanes (OGVs) 100 extending across the bypass duct 22, which therefore sit in the bypass flow B. Each OGV 100 takes the form of a large stator vane, and thus may be referred to as an aerofoil or aerofoil component 100. A plurality of OGVs 100 is typically provided as an annular array in the bypass duct 22.

Because each OGV 100 is an especially large aerofoil component, it is particularly advantageous to reduce its weight. Thus, the OGV 100 in the gas turbine engine 10 is hollow.

Figure 4:
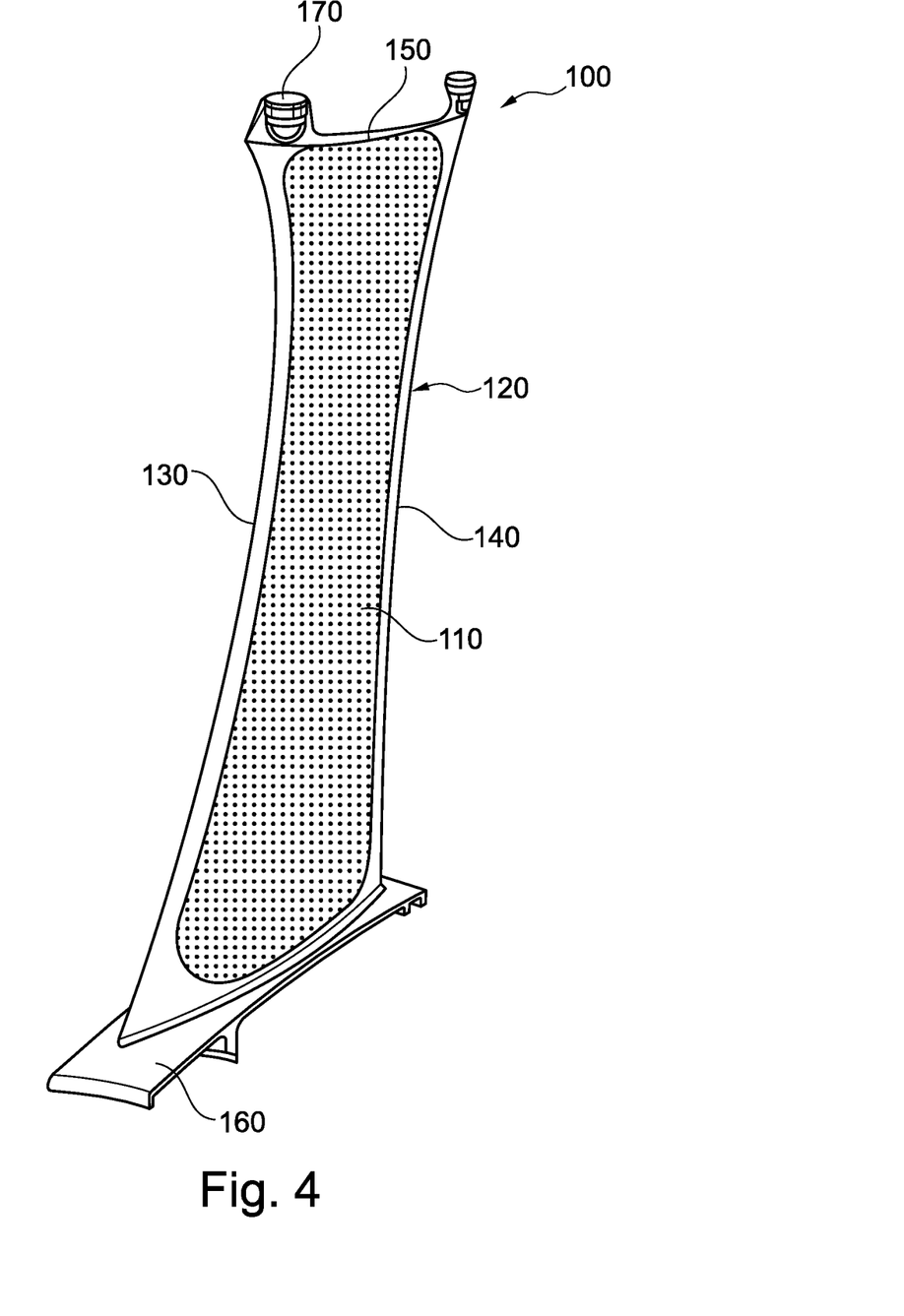
FIG. 4 is a schematic showing a finished hollow aerofoil manufactured in accordance with the method of the present disclosure.
Figure 5:
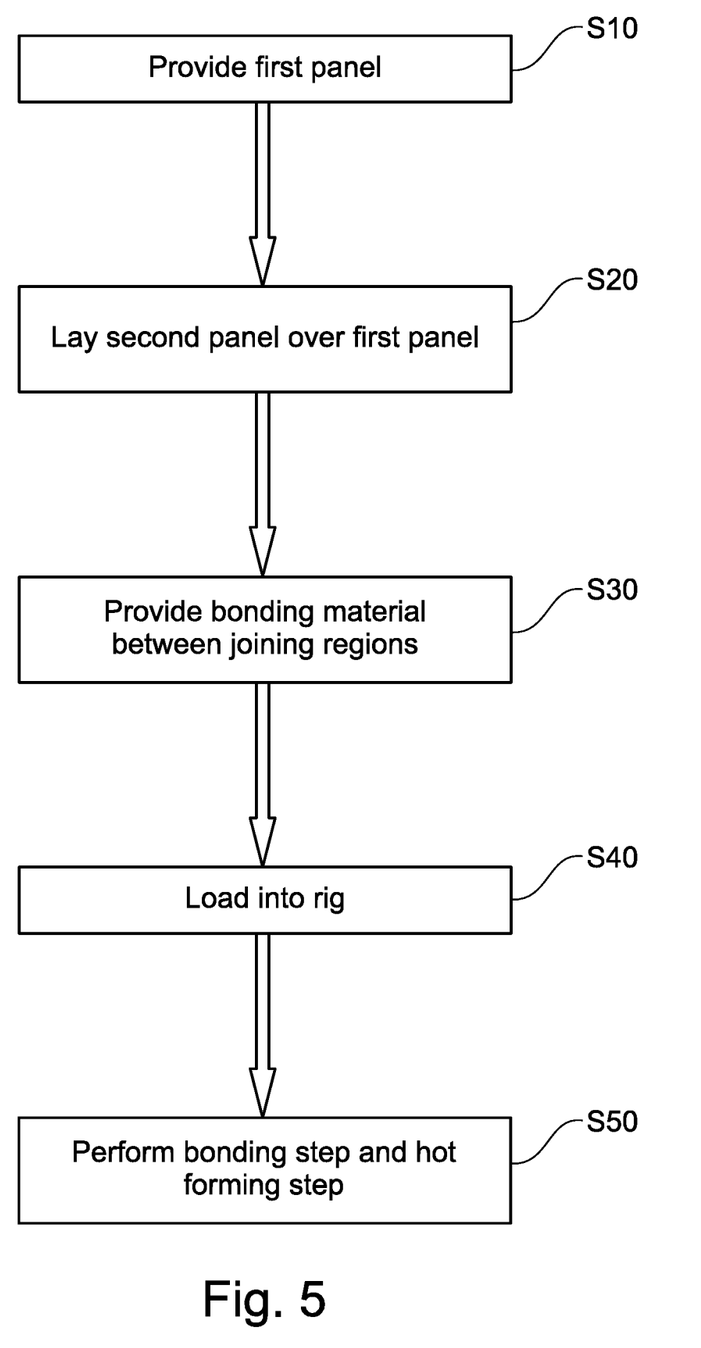
FIG. 5 is a flowchart showing an example of a method for manufacturing a hollow aerofoil in accordance with the method of the present disclosure.

FIG. 5 is a flowchart showing an example method for manufacturing (or forming) a hollow aerofoil, such as the OGV/aerofoil 100 shown in FIG. 1, and is described below in conjunction with FIGS. 2 to 4.

Figure 2:
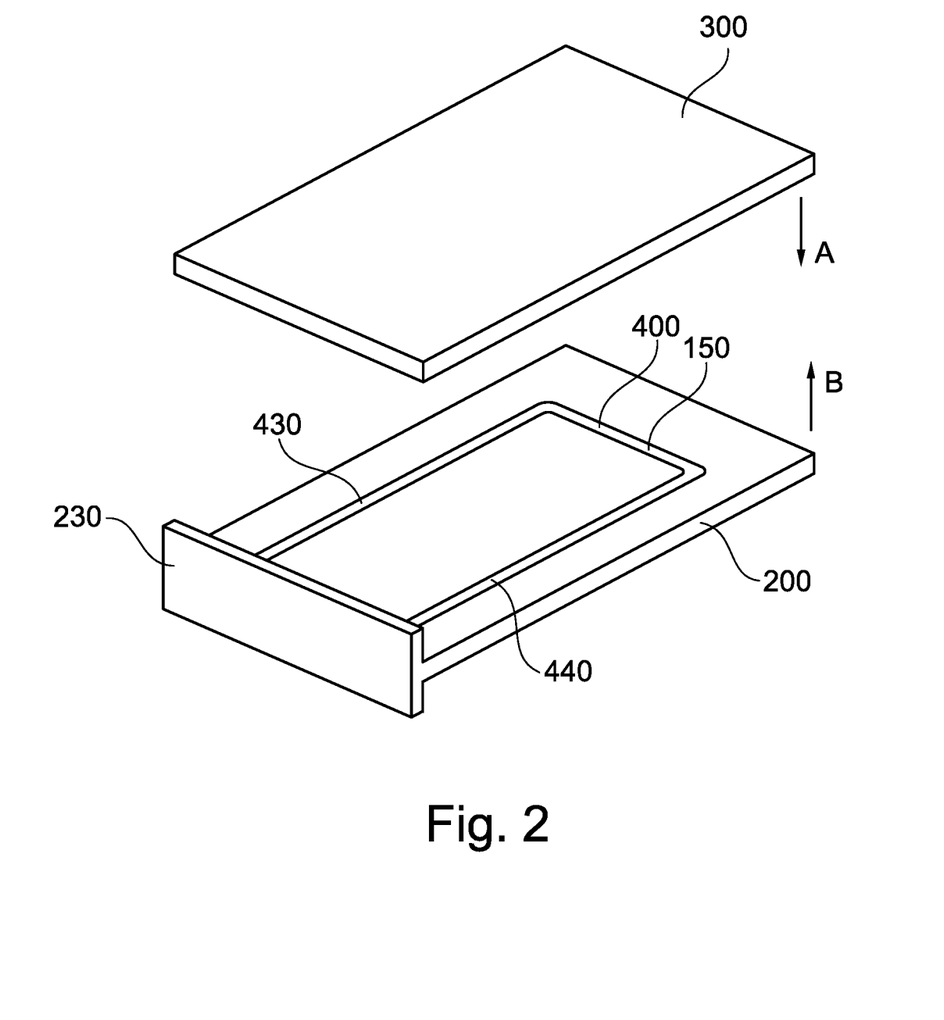
FIG. 2 is a schematic showing a first panel and a second panel.

The method starts with a step S10 of providing a first panel, which may be the first panel 200 shown in FIG. 2. As shown in FIG. 2, a second panel 300 is also provided. In step S20, the second panel 300 is laid over the first panel 200. This may alternatively be described as bringing the first panel 200 and the second panel 300 together, as illustrated by arrows A and B in FIG. 2. The first panel 200 and second panel 300 may be any suitable material, for example metallic (such as titanium), and may be the same or different materials.

A bonding material (for example an activated diffusion bonding material or a braze material) 400 is provided at one or more regions between the two panels 200, 300 being joined in step S30. The location of the bonding material 400 may define joining regions of the two panels 200, 300. The joining regions are the regions that are joined together in a subsequent bonding step (which may be an activated diffusion bonding step or a brazing step) S50. The bonding material 400 may be provided to one or both of the panels 200, 300, for example before the panels are brought together in step S20. Thus, although the step S30 of providing bonding material between the joining regions is shown as after the step S20 of laying the second panel over the first panel, the step of providing the bonding material 400 between the joining regions may actually be performed before the step of laying the second panel 300 over at least a part of the first panel 200.

The bonding material 400 may be provided in any desired location between the first panel 200 and the second panel 300. For example, the first panel 200 and/or the second panel 300 may be "oversized" in that their major surfaces (i.e. largest surfaces) are bigger than the pressure surface 120 and suction surface 110 of the aerofoil 100 being formed (see FIG. 4). In that case, the bonding material 400 may be positioned so as to define the leading edge 130 (from a leading edge portion 430 of the bonding material 400) and/or trailing edge 140 (from a trailing edge portion 440 of the bonding material 400) and/or tip 150 (from a tip portion 450 of the bonding material 450) of the finished aerofoil 100.

The bonding material 400 may be provided in any suitable form, such as a foil. By way of example, the bonding material may be an activated diffusion bonding material 400, in the form of a CuNi foil. Also by way of example, the capping panel 200 and the pocketed aerofoil body 300 shown in FIG. 3 may be titanium.

Other arrangements of first panel 200, second panel 300, and bonding material 400 are also within the scope of the present disclosure. For example, the first panel 200 may have a recess into which the second panel 300 is inserted. In such an arrangement, the bonding material 400 may be formed around at least a portion of the perimeter of the recess.

The first panel 200 may comprise a root portion 230, as in the FIG. 2 example. Such a root portion 230 may subsequently be a root 160 of the finished aerofoil 100 that is used to attach the finished aerofoil 100 to a gas turbine engine 10. As shown in FIG. 4, the finished vane 100 may comprise fixtures 160, 170 at both its inner and outer radius (which may be referred to as root and tip). Either one or both of these fixtures 160, 170 may be provided to one of the first panel 200 or second panel 300 before they are brought together for bonding and hot forming, or one or both of these fixtures 160, 170 may be provided to the assembly after the bonding and hot forming steps, for example by welding.

Figure 3:
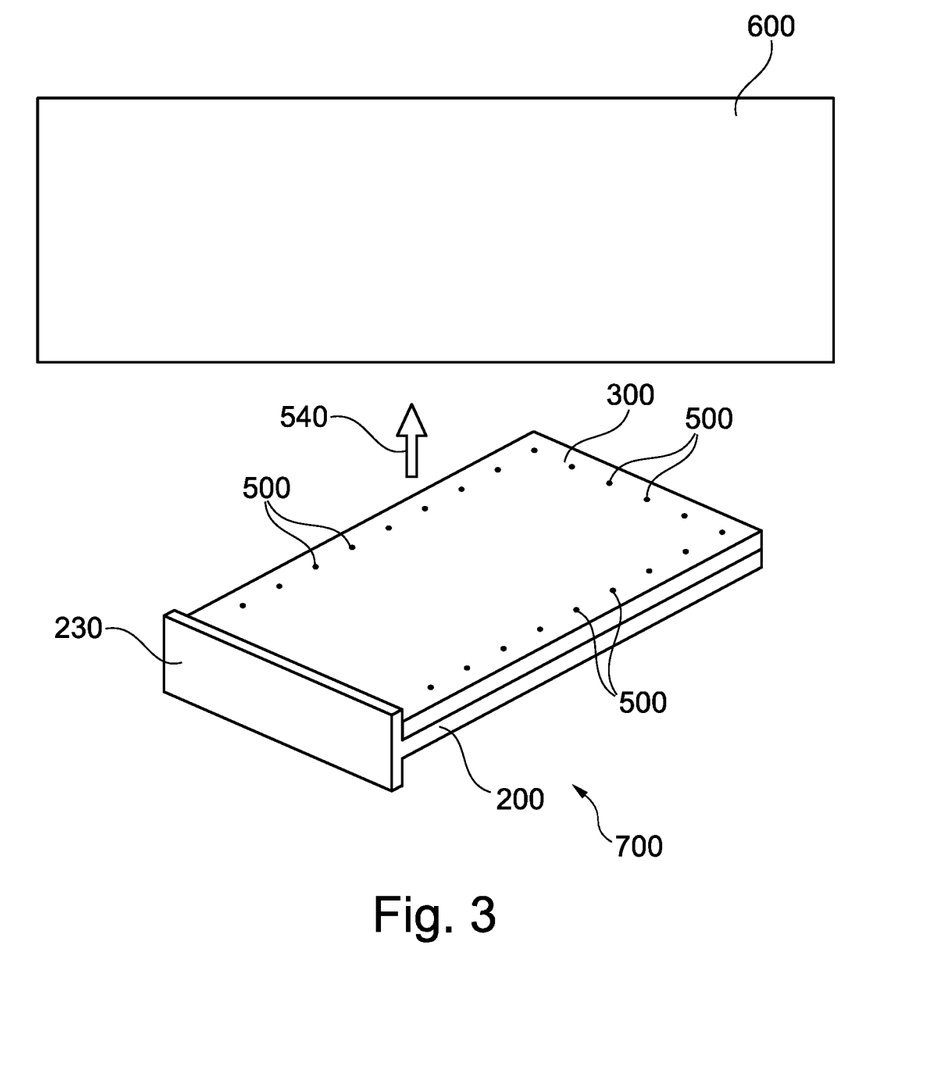
FIG. 3 is a schematic showing the first and second panels brought together.

FIG. 3 shows the two panels 200, 300 brought together to form an aerofoil sub-assembly 700 prior to being put into a rig 600, in step s40 (shown by the arrow in FIG. 3 as well as the flowchart in FIG. 5). Although not visible in FIG. 3, the two panels 200, 300 have the bonding material 400 provided therebetween in the joining region. The two panels may be temporarily held together before the bonding step, for example using tack welds 500 as in the FIG. 3 example.

Once loaded into the rig 600, the sub-assembly 700 is subjected to a bonding step and a hot forming step S50. As noted elsewhere herein, the bonding step and the hot forming step may overlap and/or may be a combined bonding and hot forming step. For the avoidance of doubt, the claims and description provided elsewhere herein in relation to the bonding step and the hot forming step may apply to any arrangement, including (but not limited to) the examples described in relation to the FIGS.

Where the bonding step is an activated diffusion bonding step, it comprises raising the temperature of the sub-assembly 700 to a bonding temperature. At the bonding temperature, the first panel 200 and the second panel 300 join together in the region of the activation material 400. The activation material 400 acts to lower the melting point of the material to which it is adjacent, and thus of the adjacent material of the first panel 200 and the second panel 300. As described elsewhere herein, the bonding temperature may be chosen to be a temperature at which the material of the first panel 200 and second panel 300 adjacent the activation material 400 melts, but remains substantially unaffected in regions away from the activation material 400. The temperature in the rig 600 may be maintained at or near to the bonding temperature for sufficient time for the activation material 400 to diffuse through the parts 200, 300 being joined. This time may include the time over which the hot forming step is performed. Accordingly, at least a part of the diffusion of the activation material through the panels 200, 300 may be performed at the same time as the hot forming step.

Purely by way of non-limitative example, the temperature in the rig 600 may be maintained at around 920 degrees C. for around 30 minutes from the start of the bonding step. The temperature may then be reduced to around 900 degrees C. and held at that temperature over the immediately subsequent 60 minutes, thereby completing the hot forming step. The total time elapsed between the start of the bonding step and the end of the hot forming step may be less than two hours, for example. In the illustrated example, the sub-assembly 700 is not removed from the rig 600 from the start of the bonding step to the end of the hot forming step. In other words, after the sub-assembly 700 is put into the rig 600, it is not removed until after the bonding step and hot forming step are complete.

If the panels 200, 300 have been joined through activated diffusion bonding, the material of the resulting hollow aerofoil 100 in the region of the join may be indistinguishable (including substantially indistinguishable) from the surrounding material. This means that the material in the region of the join has the same properties (for example in terms of strength and/or melting point) as the original material of the first panel 200 and the second 300 (at least where the first and second panels 200, 300 are the same material). Thus, for example, raising the temperature of the join region back up to the bonding temperature would not result in the join region melting or softening. Where different materials are used for the first panel 200 and the second panel 300, the material properties at the join may gradually change from those of the first panel 200 to those of the second panel 300.

During the hot forming step, the outer surfaces of the panels 200, 300 may be formed into the pressure surface 120 and suction surface 110 of the finished aerofoil 100. This may be achieved, for example, by hot creep forming, for example into a mould. Additionally or alternatively, the hot forming step may comprise hot blow forming to form the pressure surface 120 and/or suction surface.

Figure 6:
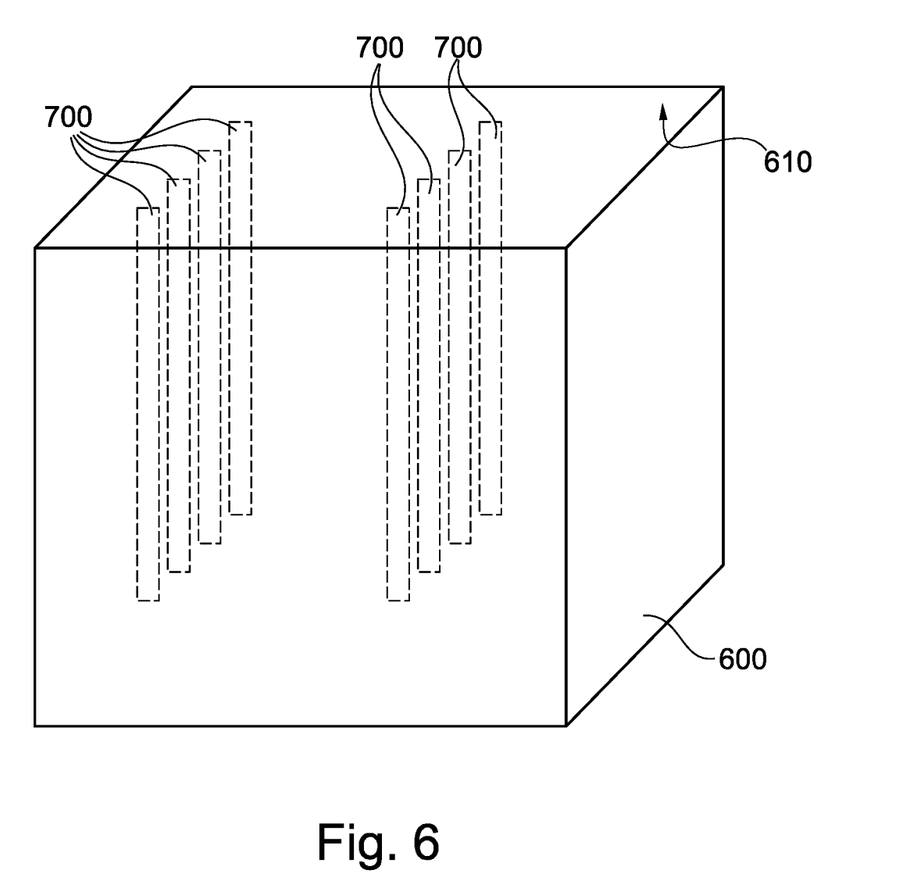
FIG. 6 is a schematic showing a fixture containing multiple intermediate aerofoil assemblies.

The bonding and hot forming steps S50 may be performed for individual sub-assemblies 700 separately or at the same time. FIG. 6 shows, in schematic form, multiple intermediate sub-assemblies 700 arranged in a box fixture 600 (which is one example of a rig 600 described and/or claimed herein). The sub-assemblies 700 are suspended from a top (or roof) surface 610 of the box fixture 600 in the FIG. 6 example. The sub-assemblies 700 shown in FIG. 6 are suspended with their longitudinal axes (i.e. the axis extending substantially from the root to the tip, along the span of the aerofoil) aligned with the vertical (i.e. aligned with gravity). The temperature and/or pressure in the box fixture 600 may be varied as required to perform the bonding and hot forming steps, for example as described and/or claimed elsewhere herein.

It will be appreciated that the aerofoil 100 being formed could be any suitable component, such as any stator vane for use in a turbine or compressor of a gas turbine engine. Purely by way of example the aerofoil 100 may be an outlet guide vane (OGV), as illustrated by way of example in FIG. 1.

It will be appreciated that many designs and/or arrangements of features—such as first panel 200, second panel 300, and method steps S10-S50—other than those shown in and described in relation to FIGS. 1 to 6 and not explicitly described herein fall within the scope of the present disclosure. Furthermore, any feature described and/or claimed herein may be combined with any other compatible feature described in relation to the same or another embodiment.

We claim:

1. A method of forming a hollow aerofoil for a gas turbine engine, the aerofoil having a pressure surface and a suction surface, the method comprising the steps of:
    providing a first panel having a leading edge, a trailing edge, a tip edge extending between first ends of the leading edge and the trailing edge, and a root edge extending between second ends of the leading edge and the trailing edge opposite the first ends;
    laying a second panel over at least a part of the first panel, the second panel having a leading edge, a trailing edge, a tip edge extending between first ends of the leading edge and the trailing edge, and a root edge extending between second ends of the leading edge and the trailing edge opposite the first ends;
    providing a bonding material between a first joining region of the first panel and a second joining region of the second panel to form an aerofoil sub-assembly, wherein the first joining region of the first panel is spaced apart from the leading edge, the trailing edge, and the tip edge of the first panel so as to define a first unjoined region between the first joining region and the leading edge, the trailing edge, and the tip edge, and wherein the second joining region of the second panel is spaced apart from the leading edge, the trailing edge, and the tip edge of the second panel so as to define a second unjoined region between the second joining region and the leading edge, the trailing edge, and the tip edge;
    loading the aerofoil sub-assembly into a forming rig and performing a bonding step in which the temperature of the first panel, second panel, and bonding material is raised to a bonding temperature at which the first panel and the second panel are joined together; and
    performing a hot forming step to generate the shape of the pressure surface and suction surface;
    wherein the hot forming step and bonding step are performed in the same forming rig,
    wherein the first panel and the second panel remain unbonded in the first unjoined region and the second unjoined region.

2. The method according to claim 1, further comprising applying a stop-off material outside the joining regions that prevents bonding between the first panel and the second panel.

3. The method according to claim 1, wherein the bonding step overlaps with the hot forming step.

4. The method according to claim 1, wherein the temperature throughout the bonding step and the hot forming step remains within a 50 degree C. range.

5. The method according to claim 1, wherein the temperature in the rig from starting the bonding step and finishing the hot forming step remains between 870 degrees C. and 950 degrees C.

6. The method according to claim 1, wherein the total time elapsed between starting the bonding step and finishing the hot forming step is less than 2 hours.

7. The method according to claim 1, wherein the temperature in the hot forming rig is held at around 920 degrees C. from the start of the bonding step for 30 minutes, then reduced to and held at around 900 degrees C. over the immediately subsequent 60 minutes, thereby completing the hot forming step.

8. The method according to claim 1, wherein the bonding step is an activated diffusion bonding step, the bonding material is an activated diffusion bonding material that acts to locally reduce the melting point of the first panel and the second panel at the respective joining regions, and, at the bonding temperature, the first panel and the second panel are joined together through activated diffusion bonding between the respective joining regions.

9. The method according to claim 8, wherein the activated diffusion bonding material comprises CuNi.

10. The method according to claim 1, wherein the bonding step comprises brazing and the bonding material is a braze material.

11. The method according to claim 10, wherein the braze material is an alloy comprising aluminium and/or silver.

12. The method according to claim 10, wherein the braze temperature of the braze material is within 50 degrees of the temperature of the hot forming step.

13. The method according to claim 1, further comprising forming an interim weld between the first panel and the second panel when forming the aerofoil sub-assembly.

14. The method according to claim 1, wherein the root edge of the first panel is configured for attaching the finished aerofoil to a gas turbine engine.

15. The method according to claim 1, wherein the hot forming process comprises hot creep forming.

16. The method according to claim 1, wherein one of the first panel and the second panel comprises a recess into which the other of the first panel and the second panel is placed when forming the aerofoil sub-assembly.

17. The method according to claim 1, wherein the first panel and the second panel are bigger than the final formed aerofoil; and the method further comprises a finishing step in which an edge region is removed to produce at least the leading and/or trailing edges of the aerofoil.

18. The method according to claim 1, wherein the first panel and/or the second panel comprise titanium.

* * * * *